United States Patent
Wei et al.

(10) Patent No.: US 9,843,997 B2
(45) Date of Patent: Dec. 12, 2017

(54) APPARATUSES, METHODS AND COMPUTER PROGRAM PRODUCTS ALLOWING COMMUNICATION VIA MULTIPLE ACCESS SYSTEMS

(71) Applicant: AVAGO TECHNOLOGIES GENERAL IP (SINGAPORE) PTE. LTD., Singapore (SG)

(72) Inventors: Na Wei, Beijing (CN); Wei Hong, Beijing (CN); Haiming Wang, Beijing (CN); Erlin Zeng, Beijing (CN)

(73) Assignee: Avago Technologies General IP (Singapore) Pte. Ltd., Singapore (SG)

( * ) Notice: Subject to any disclaimer, the term of this patent is extended or adjusted under 35 U.S.C. 154(b) by 63 days.

(21) Appl. No.: 14/783,953

(22) PCT Filed: Apr. 12, 2013

(86) PCT No.: PCT/CN2013/074128
§ 371 (c)(1),
(2) Date: Oct. 12, 2015

(87) PCT Pub. No.: WO2014/166101
PCT Pub. Date: Oct. 16, 2014

(65) Prior Publication Data
US 2016/0073333 A1 Mar. 10, 2016

(51) Int. Cl.
*H04M 1/00* (2006.01)
*H04W 48/18* (2009.01)
(Continued)

(52) U.S. Cl.
CPC .......... *H04W 48/18* (2013.01); *H04B 1/40* (2013.01); *H04W 8/18* (2013.01); *H04W 16/14* (2013.01);
(Continued)

(58) Field of Classification Search
None
See application file for complete search history.

(56) References Cited

U.S. PATENT DOCUMENTS

| | | | |
|---|---|---|---|
| 2010/0296415 A1 | 11/2010 | Sachs et al. | |
| 2011/0085498 A1* | 4/2011 | Oba | H04W 48/18 370/328 |

(Continued)

FOREIGN PATENT DOCUMENTS

| | | |
|---|---|---|
| CN | 101926205 | 12/2010 |
| CN | 102007800 | 4/2011 |
| CN | 102771097 | 11/2012 |

OTHER PUBLICATIONS

International Search Report dated Jan. 23, 2014 in PCT/CN13/074128 Filed Apr. 12, 2013.

*Primary Examiner* — Erika Washington
(74) *Attorney, Agent, or Firm* — Oblon, McClelland, Maier & Neustadt, L.L.P.

(57) ABSTRACT

In terms of enhancements in relation to, scenarios allowing communication via multiple access systems an example aspect of the present invention encompasses an apparatus, comprising a controller, configured to cause control of a transceiver which is configured to communicate via at least two access systems, receive at least two access control commands from distinct sources, each access control command commanding access to at least one of the at least two access systems, detect a conflict between at least part of the at least two commands, and in case of a detected conflict, resolve the conflict by causing to withdraw at least part of one of the at least two access control commands based on a priority relation between the at least two conflicting access control commands. Further, an apparatus is encompassed which comprises a controller, configured to cause control of a transceiver which is configured to communicate via an
(Continued)

access system with a terminal, cause to transmit an access control command to said terminal, said access control command commanding access to at least one of at least two access systems available for said terminal, cause to receive a report from the terminal regarding a detected conflict relating to said access control command. Likewise, corresponding methods and computer program products are addressed.

19 Claims, 5 Drawing Sheets

(51) Int. Cl.
  *H04W 8/18* (2009.01)
  *H04B 1/40* (2015.01)
  *H04W 16/14* (2009.01)
  *H04W 48/14* (2009.01)
  *H04W 84/12* (2009.01)
  *H04W 88/06* (2009.01)
(52) U.S. Cl.
  CPC ............ *H04W 48/14* (2013.01); *H04W 84/12* (2013.01); *H04W 88/06* (2013.01)

(56) References Cited

U.S. PATENT DOCUMENTS

| 2011/0110300 A1 | 5/2011 | Sachs et al. |
| 2011/0188376 A1 | 8/2011 | Stupar et al. |
| 2012/0069797 A1* | 3/2012 | Lim ...................... H04W 28/18 |
| | | 370/328 |
| 2016/0021606 A1* | 1/2016 | Gupta ................... H04L 5/0085 |
| | | 370/328 |

* cited by examiner

| priority information | | Yes / No |
|---|---|---|
| priorities | rule (1) | cmd #1; cmd #2 |
| | rule (2) | cmd #2; cmd #1 |
| time based validity | | Rule #1: from 09:00 am to 5 pm<br>Rule #2: from 05:00 pm to 9 am |
| location based validity | | Rule #1: cell A coverage<br>Rule #2: out of cell A coverage |

Fig. 3

Fig. 5A: An Example of 3GPP Release 10 ISRPs.

APPARATUSES, METHODS AND COMPUTER PROGRAM PRODUCTS ALLOWING COMMUNICATION VIA MULTIPLE ACCESS SYSTEMS

FIELD OF THE INVENTION

The present invention relates to apparatuses, methods and computer program products allowing communication via multiple access systems, and which are configured to achieve enhancements in relation to such scenarios.

In particular, aspects of the present invention encompass those scenarios, in which a terminal, such as a user equipment UE, is enabled to communicate via multiple access systems, e.g. via a radio access network such as LTE (Long Term Evolution) operating in a licensed band and an alternative access system such as WLAN (Wideband Local Area Network) operating in an unlicensed band.

BACKGROUND

Mobile communication is constantly making progress. A typical scenario or environment in relation to a scenario to which some aspects of the present invention are applicable, is for example a scenario as applied in conjunction with e.g. a user equipment UE that is enabled to communicate via multiple access systems, e.g. via a radio access network such as LTE (Long Term Evolution) operating in a licensed band and an alternative access system such as WLAN (Wideband Local Area Network) operating in an unlicensed band.

Note that the number of access systems is not limited to two but may be more than two. Also, more than one of the access systems may operate in a licensed band (licensed in the sense that it is reserved for such access system), or may operate in an unlicensed band (also referred to as shared band) (unlicensed or shared in the sense that plural access systems may access such band or bands, e.g. the ISM band (Industrial Scientific Medical)). Note that typically, an access system is a wireless access system but need not be limited to a wireless access system. In case of a wireless access system, typically a radio access system based on a certain radio access technology (RAT) may be encompassed. Though, other non-radio based wireless access systems may be encompassed as well, such as infrared or Bluetooth™ or Zigbee™.

Examples of a RAT comprise aforementioned LTE, or LTE-Advanced (LTE-A), but may also comprise UMTS (Universal Mobile Telecommunication System), GSM (Global Standard of Mobile Communication), GPRS (General Packet Radio Service), or the like in addition to e.g. WLAN (WiFi™) etc.

A terminal may be embodied by a so-called user equipment UE or mobile station MS or a smartphone or tablet device.

According to some aspects, in such communication scenarios, a network entity such as an access point AP (representing e.g. a WLAN access system) and/or a network transceiver device such as an evolved NodeB, eNB (representing e.g. a LTE access system and/or a (part of) a radio access network thereof (correspondingly represented by a NodeB in a UMTS RAN or a base station BS in a GSM RAN), communicates via control and payload (e.g. data or voice) channels with the terminal such as a user equipment UE.

The recent growth in data traffic driven by mobile applications on those smartphone devices, tablets, etc. has continued to strain the capacity of today's networks. Therefore, network operators are increasingly utilizing un-licensed WiFi™ or WLAN spectrum to cope with such network congestion, and this trend is expected to accelerate further as traffic demand continues to grow.

The use of unlicensed spectrum is a cost-effective means to add the needed capacity to today's networks, given the limited availability and high cost of the licensed spectrum.

Currently, WLAN is integrated as a separate access network (or access system) to the 3GPP EPC ($3^{rd}$ Generation Partnership Project Evolved Packet Core). This requires extra cost of deploying the complete WLAN access network and also impacts the 3GPP core network entities. Existing WLAN offload solutions are based on this deployment model of distinct 3GPP and WLAN access networks/systems using a common core with selective switching of flows based on operator and/or user policies. Other solutions are possible that result in a tighter integration and aggregation of 3GPP access network components with WLAN access networks without any impact to and reusing the same 3GPP core network elements.

Recently, a discussion was initiated to extend the same design principles already defined for carrier aggregation (CA) to support aggregation/coordination of cells/carriers across Wide and Local Area Networks as well. E.g. a study item referred to as "WLAN/3GPP Radio Interworking" is defined so as to evaluate LTE-WLAN and UTRA-WLAN interworking procedures while improving seamless and non-seamless mobility.

3GPP defined Access Network Discovery and Selection Function (ANDSF). This defines a client-server relationship between a client on a mobile device (e.g. UE or MS) and a centralized server. The interface that is used to exchange ANDSF information between client and server is called the S14 interface and it is defined over the IP layer (Internet Protocol). The exchange of information leading to a new client policy can be triggered by a client pull (client request) or a server push (server providing). The initial client pull occurs after the device establishes a connection, e.g. a cellular connection. The client (at the UE) provides its location information and requests a WiFi policy. A client pull also occurs when the client's device moves to another predefined location zone.

In either case, the WiFi Control Module (i.e. the server) accesses a multi-dimensional set of data (representing one or more policies) to assist in making the policy decision. These parameters include location, time, network conditions, subscriber entitlements, and charging/billing usage information. The WiFi Control Module (server) can also push an unsolicited policy to the client (UE) under certain configurable conditions, such as an increase in network utilization, a specific usage threshold exceeded, a change in subscriber entitlement or a change in time of day.

FIG. 5A illustrates an example of such policies maintained in an ANDSF server/client and referred to as Inter System Routing Policy ISRP. In that FIG. 5 distinct policies are illustrated in terms of their respective traffic description, assigned priority, preferred radios, i.e. access system to be used and respective forbidden radios (access systems) according to such policy.

Currently, the ANDSF is generally considered useful and could be considered as basis for further RAN (Radio Access Network) enhancements. But probably, one can not assume that ANDSF is always available in reality. So, a general proposal is that the solution shall be consistent with ANDSF, but shall be also independent of its presence, i.e. shall work with and without ANDSF. Since ANDSF is stored in a server, it is only connected to a mobile device through a logic S14 interface, as shown in FIG. 5B; therefore it is transparent to the core network and radio network entities.

To avoid low WLAN utilization, a network operator might want some more network control such that the eNB is imparted the capability to "command" some terminals to make offloading to WLAN. Such offloading may be applied to the entire communication of the terminal (which may be assumed to be comprised of plural possibly simultaneous services such as speech, video, streaming/downloading data, etc.) or only to a part thereof, hence be applied service specific.

If ANDSF is available and eNB control for offloading is also enabled, one possible issue is that the ANDSF content is transparent (insofar unknown) to eNB. Hence, an eNB may make network control decisions which conflict with ANDSF policies since the eNB is not aware of it.

One straightforward solution is to enable the regular information sharing between ANDSF server and all eNBs in terms of ANDSF contents/policies. However, this requires fundamental change on ANDSF structural design, and core network structure change. Further, data traffic will increase and impose a burden on the network and its interfaces.

Therefore, there is a demand to consider solutions which assume the existing structure and which avoid such fundamental changes to become necessary.

A possible consequence of the mentioned issue is that the UE may be confused whether it should obey the RAN network control command (originating at a eNB), or to obey the ANDSF policies and correspondingly resulting commands.

In a way, the ANDSF reflects operator's general preference on some typical scenarios. For example, it may forbid some services to be used in WLAN in ANDSF to guarantee safe operation, but it may not be best solution in some specific scenarios. It may happen for some cell coverage for the terminal UE, that the eNB may find that the QoS (Quality of Service) can be sufficiently supported and better than LTE. There are also some cases where the ANDSF policy is not about QoS, but about security or other reasons, so that eNB may make wrong decisions if not following ANDSF policy.

Besides, if a terminal UE rejects the RAN network control command, the network might think the UE is not suitable for offloading, or experienced link failure, and this in turn might lead to a deteriorated network and UE performance in general.

Therefore, above outlined scenarios still present open issues and those are to be addressed with more efficient solutions. The potential conflict problem as outlined above is for example addressed in some contributions.

Namely, contribution R2-131441 only mentions the problem to be addressed, but does not offer a solution thereto.

Contribution R2-131366 mentions fixed priority of RAN commands over ANDSF policies in various UE connection states, and at most that "ANDSF policy should be provided to the RAN so that it can be taken into account when making mobility decisions" (at the RAN).

Further, according to one contribution (R2-130993) any conflict between commands is beforehand prevented in that the EUTRAN entity is made aware of the ANDSF policies and only provides commands to UE which are compatible to ANDSF policies/commands. In another contribution (R2-131265), conflicts are prevented in that eNB and ANDSF provide either different information, or information from either eNB or ANDSF is limited a priori by potentially conflicting information/commands and thus not provided to a UE, which will prevent a conflict at the UE.

Hence, there is still a need to further improve such systems.

SUMMARY

Various aspects of examples of the invention are set out in the claims.

According to an aspect of the present invention (e.g. related to a terminal such as a user equipment, UE), there is provided an apparatus and a method.

According to an aspect of the present invention (e.g. related to a network entity and/or a network transceiver device such as an evolved Node_B, eNB, or an access point of e.g. a WLAN), there is provided an apparatus and a method.

Advantageous further developments are set out in respective dependent claims.

According to a further aspect of the present invention, there are provided computer program products comprising respective computer-executable components which, when the program is run on a computer, are configured to perform the above method aspects, respectively.

That is, such computer program products also encompass computer readable storage media comprising a set of computer-executable instructions which, when the program is run on a device (or on a processor or processing unit thereof which may be part of a controller or control unit or control module, or any other suitable (hardware or software implemented) means for controlling), such as a terminal UE and its processor, or a network transceiver device eNB and its processor, or an access point AP and its processor, cause the device to perform the respective method aspects. In particular, the above mentioned computer program product/products may be embodied as a computer-readable storage medium.

Accordingly, under at least some aspects of this invention, improvements are achieved in that, for example, there is provided a simple and neat solution for possible conflicts among an ANDSF policy and a RAN control command;
 a different level of tradeoff between operator's general preference and network's dynamic needs;
 an event triggered signaling exchange to avoid further conflict,
 avoidance of excessive signaling;
 rather minimizing signaling compared to autonomous reporting based on conflict event triggered report,
 increased flexibility to the network;
 a possibility for the UE to indicate the conflict to the eNB, so that the eNB can understand why there is a conflict due to being indicated a conflict reason in a conflict report, and will be prevented from taking inadequate actions in the future.

Some embodiments of the present invention can be applied to/embodied in relation to various wireless communication systems and scenarios (e.g. in relation to LTE radio access or LTE-A radio access or other future 3GPP releases, but also to GSM, UMTS, GPRS, HSPA (High Speed Packet Access)), in particular in modems and/or wireless devices and/or modules and/or chipsets thereof, in particular those related to/inserted in or insertable to devices such as terminals like a user equipment UE or mobile station MS or "smartphones" or the like, as well as those related to/inserted in or insertable to network entities such as network transceiver devices such as a Node_B or evolved Node_B eNB, or a HeNB (home eNB), or a mobility management entity MME, or a base station BS or a radio network controller RNC, or the like.

BRIEF DESCRIPTION OF DRAWINGS

For a more complete understanding of example embodiments of the present invention, reference is now made to the following descriptions taken in conjunction with the accompanying drawings in which:

FIG. 3 illustrates an example of possible priority information indicative of a priority relation between two conflicting access control commands;

FIGS. 5A & 5B illustrate in FIG. 5A an example of policies maintained in an ANDSF server/client scenario and in FIG. 5B a basic constitution of a known ANDSF client server scenario.

DESCRIPTION OF EXAMPLE EMBODIMENTS

Some exemplary aspects and/or embodiments of the invention will be described herein below.

It is to be noted that as a mere example only, the description refers to such modules or devices or apparatuses related to user equipment, UEs, which conform to the LTE/LTE-A standard and are arranged/configured for communication with correspondingly configured network entities and/or network transceiver devices such as evolved NodeB's, eNBs, as wireless communication modules or devices or apparatuses representing a first access system. Also, a network entity or network transceiver device may be represented by an access point AP conforming to WLAN representing a second access system. A terminal such as a UE given as an example herein is configured to communicate via both of those access systems, or more generally, via any of the at least two access systems.

Such communication comprises in general one or more services. Communication may reside on one or more of the access systems available. Insofar, services comprised in a communication may be susceptible to be handled in parallel or at least partly simultaneously via plural access systems; thus a communication can be divided in units of services to respective access systems. E.g. video is offloaded via WLAN as an example of a second access system, while speech is still handled via LTE as an example of a first access system. Insofar, an access control command commands access (for a communication comprising e.g. two services) to at least one of at least two access systems, e.g. commands service "video" to be handled via one access system and commands service "speech" to be handled via another access system.

However, this does not preclude the use of other wireless communication modules achieving similar functionalities, or the use of other communication standards such as e.g. WLAN, Zigbee™ etc., or GSM, GPRS, UMTS, HSPA, LTE, LTE-A and beyond, as long as the functional principles explained in relation to at least some of the aspects of the present invention are maintained. Also, the bandwidth or spectrum of bands of wireless communication used is as such not crucial for the present invention.

General technical details of such scenarios, e.g. under LTE/WLAN, and in relation to the interoperability of terminals with both (or more than two) of those using e.g. ADNSF, and adopted communication protocols are publicly available. A repeated detailed description of each such property/functionality of the known systems is considered dispensable as those skilled in the pertinent art of technology will readily understand the description as given herein. Examples of the present invention exploit those basic properties and at least in aspects modify the functionality so as to obtain the advantages of at least some embodiments under one or more aspects of the present invention.

Figure 1:
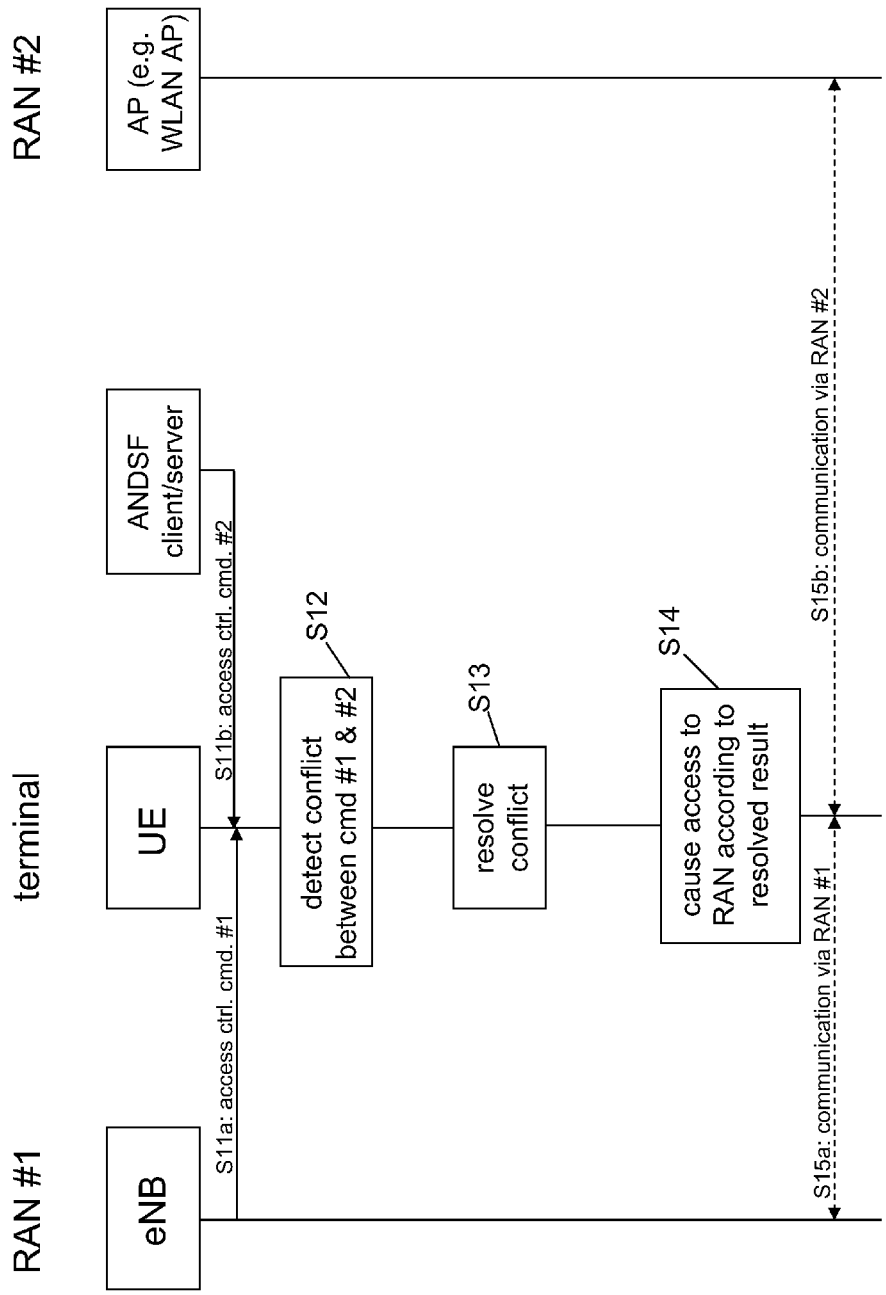
FIG. 1 illustrates an example scenario and some basic signaling between entities involved and processing at entities involved.

FIG. 1 illustrates an example scenario and some basic signaling between entities involved and processing at entities involved.

Signaling between entities involved is illustrated horizontally. Processing at a respective entity is illustrated vertically.

A terminal UE is illustrated, comprising a transceiver which is configured to communicate via at least two access systems. The access systems are as examples indicated as RAN#1 represented by an eNB (of e.g. LTE or LTE-A) and RAN#2 represented by an access point AP, e.g. a WLAN AP. Associated to the terminal is an ANDSF client/server entity as explained before.

The terminal receives, as shown in the example, at least two access control commands from distinct sources, i.e. from the eNB and from the ANDSF, as shown by stages S11a and S11b. Each access control command commands access to at least one of the at least two access systems. Such access control command may be issued upon a variety of events such as upon power on of the terminal, upon attach to one of the networks, upon a handover when roaming, upon a location area update, tracking area update, upon detection of a new access point, upon arrival at a predetermined location, or the like.

The terminal in stage S12 detects a conflict between at least part of the at least two commands. A conflict may be represented in any kind of deviation between the commands. For example, in case one command commands access to RAN#1 while the other commands access to RAN#2, but also in case both commands command access to the same RAN, e.g. RAN#1 but with different quality of service QoS, or using different ports, or the like. Or, in case a service is commanded in one command to be handled via one of the RAN, whereas in the other command such service is commanded to be excluded from being handled via that RAN. A conflict between commands may thus pertain or relate to a specific service only.

In case of a detected conflict, in stage S12, the terminal then resolves the conflict, in a stage S13, by causing to withdraw at least part of one of the at least two access control commands based on a priority relation between the at least two conflicting access control commands.

Upon the conflict being resolved, the terminal, i.e. the controller thereof (not shown in FIG. 1) is further configured to cause control of the transceiver (not shown in FIG. 1) to communicate via at least one of at least two access systems based on the access control command which was validated in that it was not withdrawn. This is illustrated by stage S14. Stated in other words, service(s) are then performed via respective access systems being selected according to the validated command(s). E.g. in case one command commands video and speech to be handled via RAN#1, while another command commands video and speech to be handled via RAN#2, such conflict upon being resolved may lead to a situation in which speech will be handled via RAN#1 while video will be handled via RAN#2, based on the priority relations between the commands and/or insofar priority relations between the services concerned in such commands. A respective part of the at least two access control commands is thus withdrawn as a result of the conflict being resolved.

In stages S15a and/or S15b, it is illustrated then that e.g. communication takes place with RAN#1 (S15a) or with RAN#2 (S15b) (if e.g. the conflict resided in a full contradiction of which RAN to use). Nevertheless, in case the conflict resided only in e.g. a QoS to be applied for communication via one of the RAN's, then in a stage S15a/S15b, the correspondingly resolved conflict will lead to corresponding access to the one of the RAN's. Further, in case a conflict concerned one or more services comprised in the communication, the resolved conflict will lead to the respective services being handled via respective ones of the respective access systems.

Figure 2:
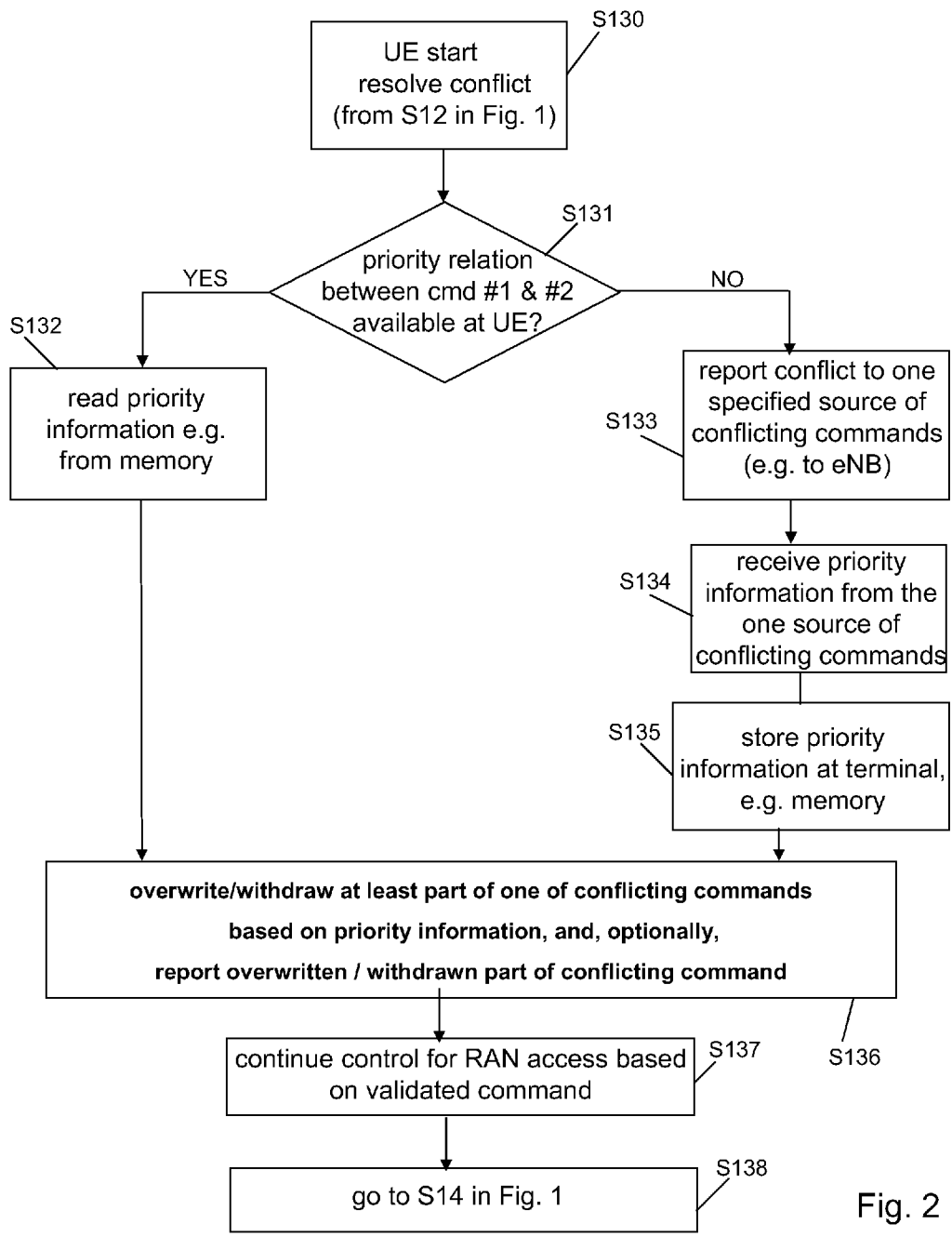
FIG. 2 illustrates one example of a flowchart of details of a processing shown in FIG. 1.

FIG. 2 illustrates one example of a flowchart of details of a processing shown in FIG. 1. Namely, FIG. 2 shows details according to an example implementation in relation to stage S13 as an example. As shown there, these details comprise that the controller of the terminal is further configured to, in order to resolve the conflict, to determine in a stage S131, whether a priority relation is available for the apparatus. A priority relation as used herein denotes any set of data enabling to determine which command has priority over the other, i.e. overrules the other, or the like (or from another perspective, which command is to be canceled or withdrawn).

In case of non-availability of such priority relation, as illustrated by NO in S131, the controller causes to control the transceiver to report the detected conflict to a specified source of said access control commands, e.g. to the eNB (or to the ANDSF), see stage S133. Throughout this document, though not limiting the invention thereto, it is assumed that a report is to be sent to the eNB or to some other network entity or node in the RAN (e.g. to a MME or a RNC), and that a priority relation or similar information is received from the eNB (or other entity/node mentioned before) in response to such report.

Thereupon, the UE's controller is further configured to, in order to resolve the conflict, receive (see stage S134) information on the priority relation from specified source (e.g. the eNB as mentioned above) of said access control commands to which the conflict was reported.

Further as shown in Stage S135, for example, the controller is further configured to cause to store the information on the priority relation received in a memory accessible by the apparatus.

On the other hand, but notwithstanding the above, in case of YES in stage S131, the controller is further configured to control access to a memory accessible by the apparatus, wherein said memory stores information on the priority relation between the at least two conflicting access control commands.

Once the controller at the UE is aware of the priority relation, based thereon it may cause to overwrite/withdraw one of the conflicting commands, as shown in stage S136. Optionally, the terminal UE may at such stage also report an overwritten/withdrawn part of a conflicting command, e.g. to the eNB. Thus, this reporting option of how the conflict was resolved is available also in case the UE knows the priority relation. In this way, the eNB as an example of a source of a conflicting command understands that (part of) its command is rejected, and also the cause or reasons of such rejection/withdrawal can be included in the report. In this way, the eNB or any other recipient of such report can avoid further such command. Otherwise, the eNB or source of command may make a wrong judgment, e.g. may think that the UE didn't get the command (and tries to resend it), or other reasons. The above outlined reporting of withdrawal was explained in terms of reporting to the eNB. Though, in general, it may be most beneficial to report the withdrawal/overwriting to the source of the command (i.e. eNB or also WLAN AP and/or ANDSF entity).

Then, the controller continues in a stage S137 to control RAN access to one of the plural RAN's based on the validated command, i.e. the one which was validated in that it was not withdrawn.

Then, in a stage S138, the process of FIG. 2 returns to stage S14 as shown in FIG. 1.

Note that the priority relation information can be transmitted by the eNB (and received by the UE) in any suitable control signaling (e.g. radio resource control RRC signaling).

FIG. 3 illustrates an example of possible priority information indicative of a priority relation between two conflicting access control commands.

As shown in FIG. 3, the information on the priority relation comprises at least one of the following:
the presence or absence of a priority relation,
a priority assigned to said access control commands from distinct sources,
a validity of such assigned priority, wherein
the validity depends on absolute or relative time and/or a location of the apparatus.

Hence, by indicating an absence of priority relation, the eNB e.g. configures or switches the UE to operate with no defined priority order (and to seek one by request/report of conflict to the eNB). Further, by indicating a presence of a priority relation, and further in case of an unconditional validity (e.g. no limited validity) of the priority relation, the eNB e.g. configures or switches the UE to operate with fixed priorities. Further, by indicating a presence of a priority relation, and further in case of a conditional validity (e.g. a limited validity e.g. in terms of absolute or relative time and/or a location of the terminal) of the priority relation, the eNB e.g. configures or switches the UE to operate with dynamic priorities.

In such case, absolute time may be represented by day time, relative time may be represented by a duration following a predetermined event (e.g. UE attach, UE handover, power on, or the like).

If a priority relation has been reported to the terminal in one case and stored to a memory accessible by the terminal (S134/S135 in FIG. 2), in case of a subsequent execution of the stages of FIG. 2 (as long as the priority relation is still valid), the flow proceeds from S131 to S132. Hence, in such scenario, one may consider that the eNB disabled the UE from conflict reporting. While, in case of expiry (due to time/location conditions not met any more) of the priority relation, conflict reporting is enabled again (branch from S131 to S133 in FIG. 2).

Further, whether stage S135 in FIG. 2 is to be executed may be indicated in a flag in the priority information, such as a "store priority information to memory" flag. Insofar, stage S135 may be optional.

FIG. 3 shows as example that presence/absence of priority relation is indicated by a flag yes/no. Priorities are listed as rules, e.g. rules (1) and (2), in which example rule (1) gives priority of command cmd#1 over cmd#2, whereas rule (2) reverts those priorities. Time based validity is indicated to for rule #1 to be valid from 9 a.m. to 5 p.m., and for rule #2 from 5 pm to 9 am. Location based validity is indicated that rule #1 is applied in case the terminal UE is in coverage of cell A (defined e.g. by the eNB), while rule #2 is to be applied in case the UE is out of cell A's coverage. Location and time based validities can be indicated (not shown in FIG. 3) to be applied cumulatively (both) or alternatively (only time or location based validity). Various other conditions may additionally be applied.

Herein above, a focus of the description was laid on the UE. However, aspects of the invention relate also to the eNB as an example of a source or origin of an access control command.

Insofar, a eNB comprises an apparatus comprising a controller, configured to cause control of a transceiver which is configured to communicate via an access system with a terminal, cause to transmit an access control command to said terminal, said access control command commanding access to one of at least two access systems available for said terminal, cause to receive a report from the terminal regarding a detected conflict relating to said access control command, and in response thereto cause to transmit information on a priority relation between said access control command transmitted from said apparatus and further access control commands from one or more distinct sources.

Likewise, the information on the priority relation comprise at least one of the following the presence or absence of a priority relation, a priority assigned to said access control commands from distinct sources, a validity of such assigned priority, wherein the validity depends on absolute or relative time and/or a location of the apparatus; with details as explained with reference to FIG. 3.

Figure 4:
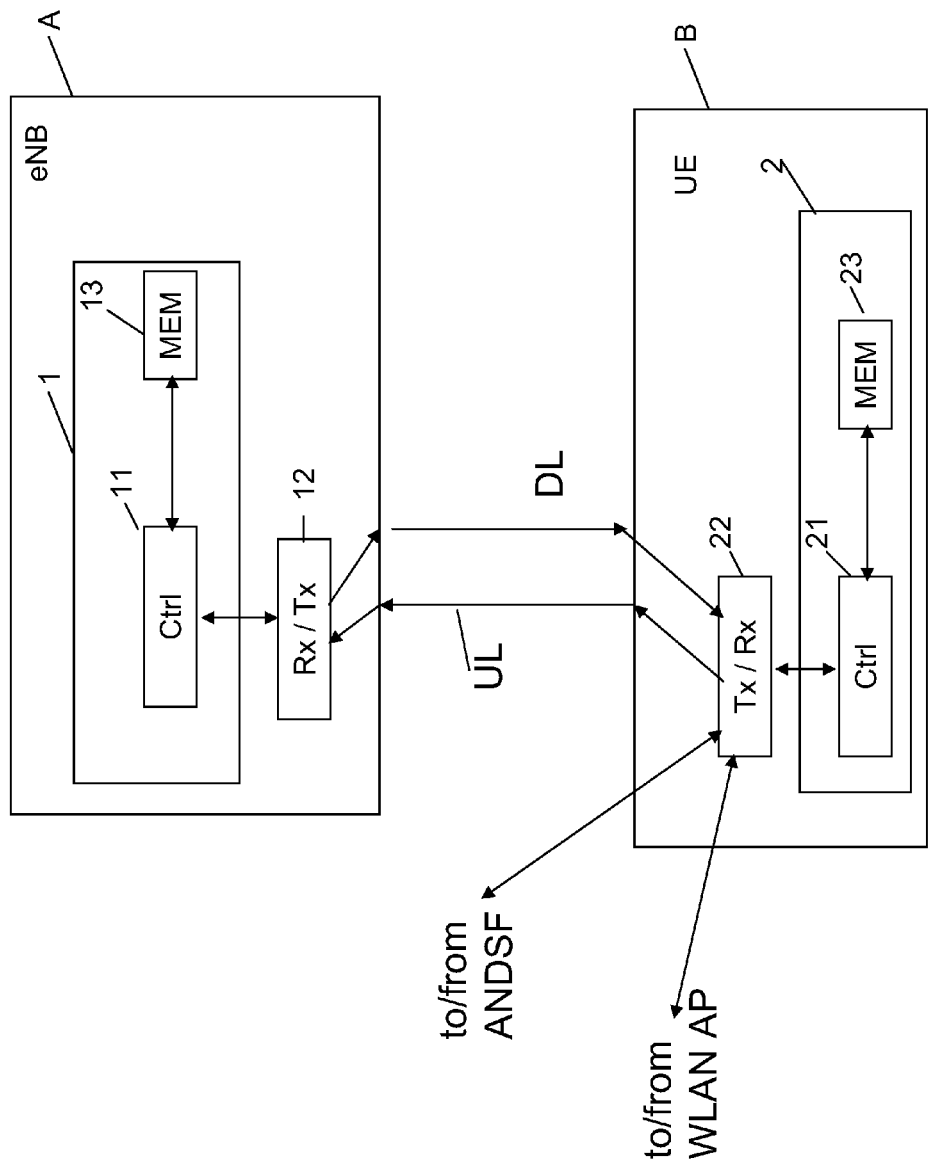
FIG. 4 illustrates a basic block circuit diagram of a terminal UE and a network entity such as a eNB.
Figures 5, 5B:
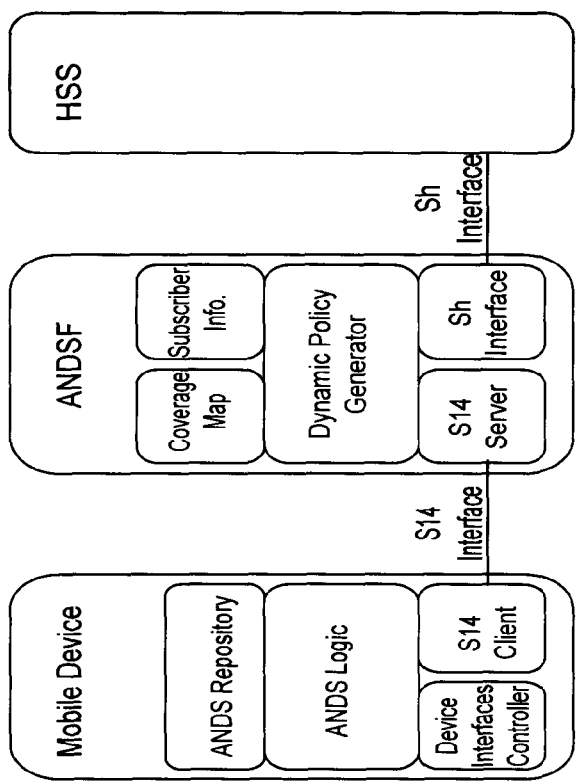

FIG. 4 illustrates one example of a network transceiver device such as an eNB and of a terminal UE and some signaling (or interface) between, as well as an outline of their internal construction. FIG. 4 illustrates one example of a typical scenario to which at least some aspects of the invention are applicable and applied.

As shown in FIG. 4, a network transceiver device such as a eNB, denoted by A, communicates in downlink (DL) via (control and payload) channels with a terminal, e.g. a user equipment UE denoted by B. The terminal B in uplink, UL, feeds back feedback control signals and/or transmits payload data to the eNB A. Also, the terminal may communicate via an access point AP (not shown in FIG. 4) of a further access system such as WLAN or WiFi™. In such scenario, in which a terminal is equipped with a transceiver which is configured to communicate via at least two access systems, an access network discovery and selection function ANDSF is also present in the scenario (not shown in FIG. 4), and the terminal also communicates (in terms of control signals) with such ANDSF entity, as illustrated by the arrow labeled "to/from ANDSF".

In terms of its internal construction in schematic overview, the network node (e.g. eNB) A comprises an apparatus 1, which in turn comprises at least a controller (or control module) 11 which is configured to control, among other parts of the eNB (not shown/discussed herein) a receiver/transmitter (or transceiver module) 12 (Rx/Tx) of the eNB, at least in terms of e.g. downlink signal transmission. The receiver/transmitter Rx/Tx 12 is under control of the controller 11, and is caused to transmit in DL to the terminal UE B. The receiver/transmitter Rx/Tx 12 is under control of the controller 11 and is caused to receive data in UL from the terminal UE B. As shown, the receiver/transmitter 12 is bi-directionally connected to the controller 11, which in turn is bi-directionally connected to a memory MEM 13. The memory stores various data, such as control code or the like used by the controller, data contained in feedback signals received in UL, data to be included in downlink (control or payload) channels transmitted in DL, etc.

As further shown in FIG. 4, in terms of its internal construction in schematic overview, a terminal device such as a UE, denoted by B, is enabled to cope with signal reception in downlink transmission of (control and payload) data to the terminal, e.g. from a eNB denoted by A (or from a WLAN AP (not shown in FIG. 4). The terminal B causes to provide and transmit feedback control signals and/or payload data in uplink, UL, to the eNB A (or to a WLAN AP (not shown in FIG. 4).

The UE B comprises an apparatus 2, which in turn comprises at least a controller (or control module) 21 which is configured to control, among other parts of the UE (not shown/discussed herein) a receiver/transmitter (or transceiver module) 22 of the UE, at least in terms of signal reception and transmission. The receiver/transmitter Rx/Tx 22 is under control of the controller 21, and is caused to receive data in DL from the eNB (or a WLAN AP (not shown)). The receiver/transmitter Rx/Tx 22, under control of the controller 21, is caused to transmit in UL to the eNB (or to the WLAN AP (not shown)). As shown further, the receiver/transmitter 12 is bi-directionally connected to the controller 21, which in turn is bi-directionally connected to a memory MEM 23. The memory stores various data, such as control code or the like used by the controller, data caused to be included in feedback signals transmitted in UL, data included in downlink control channels received in DL, and/or other data, e.g. configuration data, measurement data obtained by a measurement module (not shown).

While herein above a focus was laid on aspects of the structural composition of entities to which at least some aspects of the present invention are applicable, herein below functional aspects will be explained. As derivable form the following, various functional behaviors and/or details of at least some examples of aspects of the invention will be described herein below.

In some embodiments of the above aspect of the invention, the apparatus comprises a network entity such as a network transceiver device, e.g. an eNB or access point AP, or a terminal device UE, and in some example embodiments of the invention, the apparatus comprises part of the respective device, e.g. a modem, and wherein the apparatus conforms to operate according to the LTE™ or LTE-A™ standards and/or the WLAN or other access system standards such as Bluetooth™ or Zigbee™.

Aspects and details thereof are of course the same for the respective corresponding method implemented at or loaded to such apparatus as outlined before with regard to the respective apparatus. A repeated description here is thus considered dispensable.

Thus, as described and disclosed herein above at least in terms of some aspects of the present invention, it will be readily understood by that the proposed concepts solve the potential network control decision conflicts with ANDSF policies. Aspects of the present invention encompass scenarios in which RAN level network control is used for WLAN interworking and ANDSF is available. At least individual aspects of the present invention include flexible priority determination methods, signaling enhancements on conflict reporting, and eNB configuration flexibility.

Namely, according to one aspect,

UE Priority determination methods encompass (1) a fixed priority order, according to which a terminal UE will always assume that ANDSF policy or network RAN command has a higher priority than the other. The exact priority order may be predefined, or, as a mere example only, be configured via RRC (Radio Resource Control). If ANDSF policy is defined to be higher priority than eNB's RAN control commands, the UE will not obey eNB's order if it is against ANDSF policy. If eNB's RAN control command is defined to be higher priority than ANDSF policy, the UE will obey eNB's order even if it is against ANDSF policy;

(2) that no priority order is defined, in which case that no priority is defined, and whenever a conflict happens, the UE sends an event triggered conflict report and e.g. the eNB makes a final decision to withdraw or overwrite and indicate the decision to UE;

(3) a dynamic priority order, in which case the priority order for ANDSF policy and network RAN command can be dynamically configured in the RAN command signaling. The eNB may order some offloading command to be of lower priority than ANDSF policy, or order some higher priority offloading command which can overwrite ANDSF policy. A priority order may be assigned a validity over time or location dependent, or the like.

For example, in terms of commands relating to lower/higher priority offloading, according to one example, there may be assumed that there are two services, service #1 and #2, which a certain UE is actively using. The eNB may command service#2 (video chat) to be offloaded as higher priority than other policy, even if ANDSF policy blocks such service to be offloaded; then, the UE should follow such eNB command. But on the other hand, if eNB commands certain service#1 (voice call) to be offloaded as lower priority than other policy, then, if ANDSF policy blocks such service to be offloaded, UE will not follow such eNB command.

Namely, according to another aspect, signaling Enhancements encompass that when conflicts happen, the UE, apart from reporting the conflict as such, may consider to report ANDSF policy to RAN e.g. to eNB via air interface, with a cause indication of "conflicts" and/or conflicted information. This can be defined as event triggered conflict report.

At least optionally, apart from merely indicating the presence (e.g. using a one bit flag) of a conflict, a conflict report may also (in such case using plural bits or bytes) indicate the reason or cause of conflict. For example, the reason may address security related aspects, whether another or no other access system is available, a condition (e.g. QoS, etc.) in the access system changed ("bad channel"), a terminal's (or user's) preferences, terminal conditions such as low battery, or any other possible reason for a conflict having its origin at the terminal, at a network entity or access system involved.

Further, according to still another aspect, the eNB provides for configuration flexibility of priority relations in that a priority order policy can be switched by the network (enB) (switched between fixed priority, no priority, dynamic priority); the conflict reporting can be enabled or disabled by network; a validity of priority relations in time domain e.g. represented by a time interval may be defined for different priority rule, e.g. in a time window [T, T+ΔT], priority rule#1 is valid; and priority rule#2 is valid in a time window [T+ΔT, T+2ΔT]. This resembles a relative validity in which a starting time T may be defined by a certain event such as attach, handover of the terminal, or the like. On the other hand, validity of priority relations can be defined in absolute times such as based on day time or based on location of the terminal.

Hereinbefore, the eNB was mentioned as an entity to which the conflict report is sent and which provides the terminal UE with priority relation information. Though, in another scenario, such report may be sent to an access point AP which will furnish priority relation information. Still further, the priority relation information may be requested (by a conflict report) to be received from an entity independent of any of the access systems accessible by the terminal.

It is still to be noted that some embodiments of the invention may be implemented in software, hardware, application logic or a combination thereof, i.e. a combination of software, hardware and application logic. The software, application logic and/or hardware generally reside on control modules or modems, in general circuitry. In an example embodiment, the application logic, software or an instruction set is maintained on any one of various conventional computer-readable media. In the context of this document, a "computer-readable medium" may be any media or means that can contain, store, communicate, propagate or transport the instructions for use by or in connection with an instruction execution system, apparatus, or device, such as a computer or smart phone, or user equipment.

As used in this application, the term 'circuitry' refers to all of the following:

(a) hardware-only circuit implementations (such as implementations in only analog and/or digital circuitry) and (b) to combinations of circuits and software (and/or firmware), such as (as applicable):

(i) to a combination of processor(s) or (ii) to portions of processor(s)/software (including digital signal processor(s)), software, and memory(ies) that work together to cause an apparatus, such as a mobile phone or user equipment or any other terminal, or network entity such as a server, to perform various functions) and (c) to circuits, such as a microprocessor(s) or a portion of a microprocessor(s), that require software or firmware for operation, even if the software or firmware is not physically present.

This definition of 'circuitry' applies to all uses of this term in this application, including in any claims. As a further example, as used in this application, the term "circuitry" would also cover an implementation of merely a processor (or multiple processors) or portion of a processor and its (or their) accompanying software and/or firmware. The term "circuitry" would also cover, for example and if applicable to the particular claim element, a baseband integrated circuit or applications processor integrated circuit for a mobile phone (terminal) or a similar integrated circuit in server, a cellular network device, or other network device. That is, it can be implemented as/in chipsets to such devices, and/or modems thereof.

If desired, the different functions discussed herein may be performed in a different order and/or concurrently with each other. Furthermore, if desired, one or more of the above-described functions may be optional or may be combined.

Although various aspects of the invention are set out in the independent claims, other aspects of the invention comprise other combinations of features from the described embodiments and/or the dependent claims with the features of the independent claims, and not solely the combinations explicitly set out in the claims.

It is also noted herein that while the above describes example embodiments of the invention, these descriptions should not be viewed in a limiting sense. Rather, there are several variations and modifications which may be made without departing from the scope of the present invention as defined in the appended claims.

LIST OF AT LEAST SOME ACRONYMS

UE User Equipment
LTE Long Term Evolution
WLAN Wideband Local Area Network
ISM Industrial Scientific Medical
RAT Radio Access Technology
RAN Radio Access Network
LTE-A LTE-Advanced
UMTS Universal Mobile Telecommunication System
GSM Global Standard of Mobile Communication
GPRS General Packet Radio Service
MS Mobile Station
AP Access Point
eNB evolved NodeB
BS Base Station
3GPP $3^{rd}$ Generation Partnership Project
EPC Evolved Packet Core
CA Carrier Aggregation
UTRA Universal Terrestrial Radio Access
ANDSF Access Network Discovery and Selection Function
IP Internet Protocol
ISRP Inter System Routing Policy
QoS Quality of Service
HSPA High Speed Packet Access
HeNB home eNB
MME Mobility Management Entity
RNC Radio Network Controller
RRC Radio Resource Control Accordingly, as has been described herein above, in terms of enhancements in relation to, scenarios allowing communication via multiple access systems an example aspect of the present invention encompasses an apparatus, comprising a controller, configured to cause control of a transceiver which is configured to communicate via at least two access systems, receive at least two access control commands from distinct sources, each access control command commanding access to at least one of the at least two access systems, detect a conflict between at least part of the at least two commands, and in case of a detected conflict, resolve the conflict by causing to withdraw at least part of one of the at least two access control commands based on a priority relation between the at least two conflicting access control commands. Further, an apparatus is encompassed which comprises a controller, configured to cause control of a transceiver which is configured to communicate via an access system with a terminal, cause to transmit an access control command to said terminal, said access control command commanding access to at least one of at least two access systems available for said terminal, cause to receive a report from the terminal regarding a detected conflict relating to said access control command. Likewise, corresponding methods and computer program products are addressed.

What is claimed is:
1. An apparatus, comprising:
    a controller, configured to
        control a transceiver which is configured to communicate via at least two access systems,
        receive at least two access control commands from distinct sources, each access control command commanding access to at least one of the at least two access systems,
        detect a conflict between at least part of the at least two commands, and in case of a detected conflict,
        resolve the conflict by
            determining whether a priority relation is available for the apparatus, and in case of non-availability, control the transceiver to report the detected conflict to a specified source of the access control commands.
2. The apparatus according to claim 1, wherein
the controller is further configured to, in order to resolve the conflict, receive information on the priority relation from the specified source of the access control commands to which the conflict was reported.
3. The apparatus according to claim 2, wherein
the controller is further configured to cause to store the information on the priority relation received in a memory accessible by the apparatus.
4. The apparatus according to claim 1, wherein
the apparatus comprises a user equipment.
5. The apparatus according to claim 1, wherein
the apparatus is configured for use in Long Term Evolution (LTE) or Long Term Evolution Advanced (LTE-A) system.
6. The apparatus according to claim 1, wherein
the controller is further configured to withdraw at least part of one of the at least two access control commands based on the priority relation between the at least two conflicting access control commands when the priority relation is available.
7. The apparatus according to claim 6, wherein the controller is further configured to control the transceiver to communicate via at least one of at least two access systems based on the access control command which was validated in that it was not withdrawn.
8. The apparatus according to claim 6, wherein
the controller is further configured to control access to a memory accessible by the apparatus, wherein the memory stores information on the priority relation between the at least two conflicting access control commands.
9. The apparatus according to claim 6, wherein
the information on the priority relation comprise at least one of the following
    the presence or absence of a priority relation,
    a priority assigned to said access control commands from distinct sources, a validity of such assigned priority, wherein
the validity depends on absolute or relative time and/or a location of the apparatus.
10. A method, comprising:
controlling a transceiver which is configured to communicate via at least two access systems,
receiving at least two access control commands from distinct sources, each access control command commanding access to at least one of the at least two access systems,
detecting a conflict between at least part of the at least two commands, and in case of a detected conflict,
resolving the conflict by
    determining whether a priority relation is available for the apparatus, and in case of non-availability, controlling the transceiver to report the detected conflict to a specified source of said access control commands.

11. The method according to claim 10, wherein
the resolving further comprises receiving information on the priority relation from the specified source of said access control commands to which the conflict was reported.

12. The method according to claim 11, further comprising:
storing the information on the priority relation received in a memory accessible by the apparatus.

13. The method according to claim 10, wherein
the method is implemented at a user equipment.

14. The method according to claim 10, wherein
the method is configured for use in Long Term Evolution (LTE) or Long Term Evolution Advanced (LTE-A) system.

15. A non-transitory computer program product comprising respective computer-executable components which, when the program is run on a computer, are configured to perform the above method aspects according to claim 10.

16. The method according to claim 10, further comprising:
withdrawing at least part of one of the at least two access control commands based on a priority relation between the at least two conflicting access control commands when the priority relation is available.

17. The method according to claim 16, further comprising
controlling the transceiver to communicate via at least one of at least two access systems based on the access control command which was validated in that it was not withdrawn.

18. The method according to claim 16, further comprising:
controlling access to a memory accessible by the apparatus, wherein said memory stores information on the priority relation between the at least two conflicting access control commands.

19. The method according to claim 16, wherein
the information on the priority relation comprise at least one of the following
the presence or absence of a priority relation,
a priority assigned to said access control commands from distinct sources, a validity of such assigned priority, wherein
the validity depends on absolute or relative time and/or a location of the apparatus.

* * * * *